United States Patent
Kao

(10) Patent No.: US 11,300,863 B2
(45) Date of Patent: Apr. 12, 2022

(54) WAVELENGTH CONVERSION MODULE AND PROJECTION DEVICE

(71) Applicant: Coretronic Corporation, Hsin-Chu (TW)

(72) Inventor: Wei-Hua Kao, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 137 days.

(21) Appl. No.: 16/746,977

(22) Filed: Jan. 20, 2020

(65) Prior Publication Data

US 2020/0241403 A1    Jul. 30, 2020

(30) Foreign Application Priority Data

Jan. 24, 2019    (CN) .......................... 201910067002.5

(51) Int. Cl.
*G03B 21/20*    (2006.01)
*H04N 9/31*    (2006.01)

(52) U.S. Cl.
CPC ......... *G03B 21/204* (2013.01); *H04N 9/3161* (2013.01)

(58) Field of Classification Search
CPC . G03B 21/204; F21K 9/64; F21V 1/17; F21V 3/08; F21V 3/12; F21V 5/10;
(Continued)

(56) References Cited

U.S. PATENT DOCUMENTS

2014/0071683 A1* 3/2014 Hamada .................. C09K 11/08
                                                                                362/259
2017/0084809 A1    3/2017 Jiang et al.
(Continued)

FOREIGN PATENT DOCUMENTS

CN    102434853    5/2012
CN    103367611    10/2013
(Continued)

OTHER PUBLICATIONS

Office Action of China Counterpart Application, dated Mar. 24, 2021, pp. 1-8.

*Primary Examiner* — Michelle M Iacoletti
*Assistant Examiner* — Christopher A Lamb, II
(74) *Attorney, Agent, or Firm* — JCIPRNET

(57) ABSTRACT

A wavelength conversion module and a projection device are provided. The wavelength conversion module includes a substrate, a first matching material layer, a wavelength conversion layer, a second matching material layer, and a filling adhesive channel. The first matching material layer is located on the substrate. The wavelength conversion layer is located between the substrate and the first matching material layer, and the wavelength conversion layer includes a plurality of first holes, a wavelength conversion material, and a bonding material. The wavelength conversion material is dispersed in the bonding material. The second matching material layer is located between the substrate and the wavelength conversion layer. The filling adhesive channel is connected to the first matching material layer and the second matching material layer, and the second matching material layer, the filling adhesive channel, and the first matching material layer have a filling adhesive with the same material.

18 Claims, 4 Drawing Sheets

(58) Field of Classification Search
CPC ..... F21V 7/26; F21V 7/30; F21V 9/30; F21V 9/32; F21V 9/38; F21V 9/40; F21V 9/45; G02F 1/133614; H01L 33/50
See application file for complete search history.

(56) References Cited

U.S. PATENT DOCUMENTS

| | | | | |
|---|---|---|---|---|
| 2017/0160627 A1* | 6/2017 | Ikesue | ................... | G03B 21/16 |
| 2017/0167710 A1* | 6/2017 | Wu | ........................... | F21V 9/08 |
| 2018/0059522 A1* | 3/2018 | Huang | ................. | H01L 27/142 |

FOREIGN PATENT DOCUMENTS

| | | |
|---|---|---|
| CN | 103534824 | 1/2014 |
| CN | 106206904 | 12/2016 |
| CN | 209327770 | 8/2019 |
| TW | I512385 | 12/2015 |

\* cited by examiner

WAVELENGTH CONVERSION MODULE AND PROJECTION DEVICE

CROSS-REFERENCE TO RELATED APPLICATION

This application claims the priority benefit of China application serial no. 201910067002.5 filed on Jan. 24, 2019. The entirety of the above-mentioned patent application is hereby incorporated by reference herein and made a part of this specification.

BACKGROUND OF THE INVENTION

Field of the Invention

The invention relates to an optical module and an optical device including the optical module, and more particularly, to a wavelength conversion module and a projection device.

Description of Related Art

In recent years, projection devices based on solid-state light sources such as light-emitting diodes (LEDs) and laser diodes have gradually gained a place in the market. Since laser diodes have a luminous efficiency of higher than about 20%, to break the light source limit of the LED, a solid color light source needed for the projector generated by exciting a phosphor via a laser source has gradually been developed.

However, in general, the manufacture of the current phosphor wheel involves mixing a phosphor or a reflective material with silicone and then coating the mixture on the substrate of the phosphor wheel to respectively form a wavelength conversion layer or a reflection layer of the phosphor wheel. However, silicone has issues such as lack of high-temperature resistance and degradation, and therefore when the laser excites the phosphor wheel over a long period of time, the silicone may not tolerate the high temperature such that degradation or burning readily occurs, thus affecting the luminous efficiency and reliability of the phosphor wheel. Moreover, another process for the phosphor wheel is to replace the silicone-mixed phosphor or the reflective material with an inorganic binder (for example, glass adhesive or ceramic material) to form a phosphor wheel. The phosphor wheel formed by the process has better thermal conductivity and heat resistance. However, during the sintering or curing molding process of such phosphor wheel, some of the binder, the dispersant, the additive and the like are volatilized into the air, and holes are created in the wavelength conversion layer or the reflection layer, and the holes do not communicate with each other, so that the air in the holes is difficult to be completely discharged or replaced with other materials. Moreover, since the refractive index of the air in these holes (approx. 1) is too different from the refractive index of phosphor or glass (approximately 1.5), the air in these holes will reduce the amount of light received by the phosphor layer of the phosphor wheel, which in turn affects the conversion efficiency thereof.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a wavelength conversion module having good conversion efficiency.

The invention provides a projection apparatus having good optical quality.

Other objects and advantages of the invention may be further understood from the technical features disclosed by the invention.

In order to achieve one or a portion of or all of the above objects or other objects, an embodiment of the invention provides a wavelength conversion module. The wavelength conversion module includes a substrate, a first matching material layer, a wavelength conversion layer, a second matching material layer, and a filling adhesive channel. The first matching material layer is located on the substrate. The wavelength conversion layer is located between the substrate and the first matching material layer, and the wavelength conversion layer includes a plurality of first holes, a wavelength conversion material, and a bonding material. The wavelength conversion material is dispersed in the bonding material. The second matching material layer is located between the substrate and the wavelength conversion layer. The filling adhesive channel is connected to the first matching material layer and the second matching material layer, and the second matching material layer, the filling adhesive channel, and the first matching material layer have a filling adhesive with the same material.

In order to achieve one or a portion of or all of the above objects or other objects, an embodiment of the invention provides a projection device. The projection device includes the abovementioned wavelength conversion module, an excitation light source, a light valve, and a projection lens. The excitation light source is adapted to emit an excitation light beam, wherein the excitation light beam is transmitted to the wavelength conversion module and is formed into an illumination beam via the wavelength conversion module. The light valve is located in the transmission path of the illumination beam and is adapted to form the illumination beam into an image beam. The projection lens is located in the transmission path of the image beam and is adapted to form the image beam into a projection beam.

Based on the above, the embodiments of the invention have at least one of the following advantages or efficacies. In an embodiment of the invention, the projection device and the wavelength conversion module may fill the first holes using the filling adhesive via the filling adhesive channel formed by the first holes, thereby improving the conversion efficiency of the wavelength conversion layer. Moreover, the wavelength conversion module may also enhance the transmittance of visible light by the configuration of the first matching material layer, thereby improving the conversion efficiency of the wavelength conversion layer. In addition, since the projection device uses the wavelength conversion module having good conversion efficiency, the projection device may therefore have good conversion efficiency and optical quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
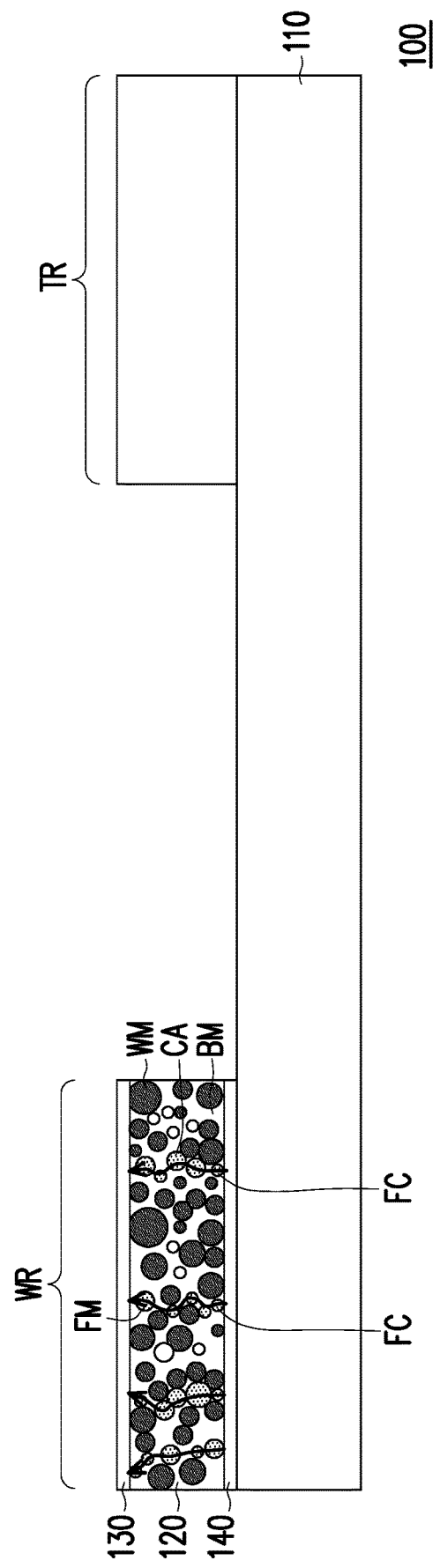
FIG. 1A is a cross section of a wavelength conversion module of an embodiment of the invention.
Figure 1B:
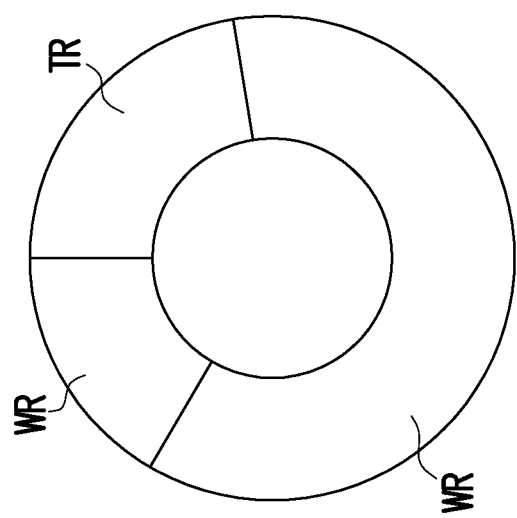
FIG. 1B is a top view of the wavelength conversion module of FIG. 1A.

FIG. 1A is a cross section of a wavelength conversion module of an embodiment of the invention. FIG. 1B is a top view of the wavelength conversion module of FIG. 1A. Referring to FIG. 1A and FIG. 1B, a wavelength conversion module 100 of the present embodiment has at least one wavelength conversion region WR and a light passing region TR. Specifically, as shown in FIG. 1A, the wavelength conversion module 100 includes a substrate 110, a first matching material layer 130, a wavelength conversion layer 120, a second matching material layer 140, and a filling adhesive channel FC. As shown in FIG. 1A, in the present embodiment, the first matching material layer 130, the wavelength conversion layer 120, and the second matching material layer 140 are all located on the substrate 110, and the wavelength conversion layer 120 is located between the substrate 110 and the first matching material layer 130, and the second matching material layer 140 is located between the substrate 110 and the wavelength conversion layer 120. Further, the first matching material layer 130, the wavelength conversion layer 120, and the second matching material layer 140 are disposed corresponding to the wavelength conversion region WR. In the present embodiment, the material of the substrate 110 may be aluminum, aluminum alloy, copper, copper alloy, aluminum nitride, or silicon carbide, and has good thermal conductivity and heat resistance.

Further, as shown in FIG. 1A, in the present embodiment, the wavelength conversion layer 120 includes a plurality of first holes CA, a wavelength conversion material WM, and a bonding material BM. The wavelength conversion material WM is dispersed in the bonding material BM. For example, in the present embodiment, the thickness of the wavelength conversion layer 120 is equal to or greater than 0.05 mm and less than or equal to 0.3 mm. Further, in the present embodiment, the range of the particle size of the wavelength conversion material WM is between 5 nm and 500 nm. It should be mentioned that, the numerical range here is only exemplary and is not intended to limit the invention.

More specifically, as shown in FIG. 1A, in the present embodiment, the filling adhesive channel FC is connected to the first matching material layer 130 and the second matching material layer 140, and the second matching material layer 140, the filling adhesive channel FC, and the first matching material layer 130 have a filling adhesive FM with the same material. For example, as shown in FIG. 1A, in the present embodiment, the second matching material layer 140 includes the filling adhesive FM, and the first holes CA in the wavelength conversion layer 120 may form the filling adhesive channel FC, and after the filling adhesive FM penetrates to the filling adhesive channel FC formed by a portion of the first holes CA of the wavelength conversion layer 120 via capillary action, the first matching material layer 130 is formed on the surface of the wavelength conversion layer 120. As such, the second matching material layer 140, the filling adhesive channel FC, and the first matching material layer 130 simultaneously contain the filling adhesive FM.

Specifically, in the present embodiment, the material of the filling adhesive FM in the second matching material layer 140, the filling adhesive channel FC, and the first matching material layer 130 includes a silicone, an epoxy resin, an alcohol-soluble inorganic binder, or an aqueous inorganic binder. For example, in the present embodiment, the second matching material layer 140 includes a silicone, an epoxy resin, an alcohol-soluble inorganic adhesive, or an aqueous inorganic adhesive, and the thickness of the second matching material layer 140 is less than or equal to 0.1 mm, but invention is not limited thereto. In another embodiment, if the material of the filling adhesive FM in the second matching material layer 140, the filling adhesive channel FC, and the first matching material layer 130 includes a silicone containing thermal conductive material powder or an epoxy resin containing thermal conductive material powder, that is, the second matching material layer 140 includes a silicone containing thermal conductive material powder or an epoxy resin containing thermal conductive material powder, and the thickness of the second matching material layer 140 may be increased to a range less than or equal to 0.2 mm.

For example, in the present embodiment, the range of the volume percentage of the first holes CA in the wavelength conversion layer 120 is equal to or greater than 5%. In this way, the first holes CA may easily form a filling adhesive channel FC, and the effect of the filling adhesive FM penetrating to a portion of the first holes CA of the wavelength conversion layer 120 via capillary action is more significant, thus facilitating the filling of the first holes CA, and the first matching material layer 130 may be more readily formed on the surface of the wavelength conversion layer 120. For example, in the present embodiment, the thickness of the first matching material layer 130 is greater than 0 and less than or equal to 30 microns, but the invention is not limited thereto.

For example, in the present embodiment, the range of the refractive index of the filling adhesive FM in the second matching material layer 140, the filling adhesive channel FC, and the first matching material layer 130 is greater than or equal to 1.1 and less than or equal to 1.9. Thus, since the first holes CA are filled by the filling adhesive FM and have a refractive index similar to that of the wavelength conversion material WM, it is possible to avoid the risk that the amount of light received by the wavelength converting layer 120 is reduced due to the presence of these first holes CA. Therefore, the conversion efficiency of the wavelength conversion layer 120 is improved.

As described above, in the present embodiment, the range of the refractive index of the first matching material layer 130 is equal to or greater than 1.1 and less than or equal to 1.9, and further, in the present embodiment, the refractive index of the first matching material layer 130 may be designed to be less than the refractive index of the wavelength conversion layer 120. For example, the refractive index of the first matching material layer 130 may be set to 1.2. Thus, since the visible light transmitted to the wavelength conversion module 100 first penetrates the first matching material layer 130 and then enters the wavelength conversion layer 120, it may be known from the equation related to the refractive index ratio and the transmittance ratio of light penetrating the interface of different dielectric layers calculated by a Fresnel equation based on the refractive indices of different dielectric layers that the value of the transmittance of the visible light is about 98%. In contrast, the value of the transmittance of the known wavelength conversion module 100 without the first matching material layer 130 is only about 96%. Accordingly, the wavelength conversion module 100 may enhance the transmittance of visible light by the configuration of the first matching material layer 130, thereby improving the conversion efficiency of the wavelength conversion layer 120.

Specifically, in the present embodiment, the transmittance of the visible light having a wavelength range falling between 400 nm and 700 nm penetrating the first matching material layer 130 or the second matching material layer 140 is greater than 90%. Moreover, in the present embodiment, the bonding material BM is an inorganic material including silicon dioxide and a metal oxide, and the transmittance of the visible light having a wavelength range falling between 400 nm and 700 nm penetrating the bonding material BM is greater than 90%. As such, visible light having a wavelength range falling between 400 nm and 700 nm has good transmittance for both the first matching material layer 130 and the second matching material layer 140, and easily enters the wavelength conversion region WR.

In this way, the wavelength conversion module 100 may fill the first holes CA using the filling adhesive FM via the filling adhesive channel FC formed by the first holes CA, thereby improving the conversion efficiency of the wavelength conversion layer 120. Moreover, the wavelength conversion module 100 may also enhance the transmittance of visible light by the configuration of the first matching material layer 130, thereby improving the conversion efficiency of the wavelength conversion layer 120.

Figure 2:
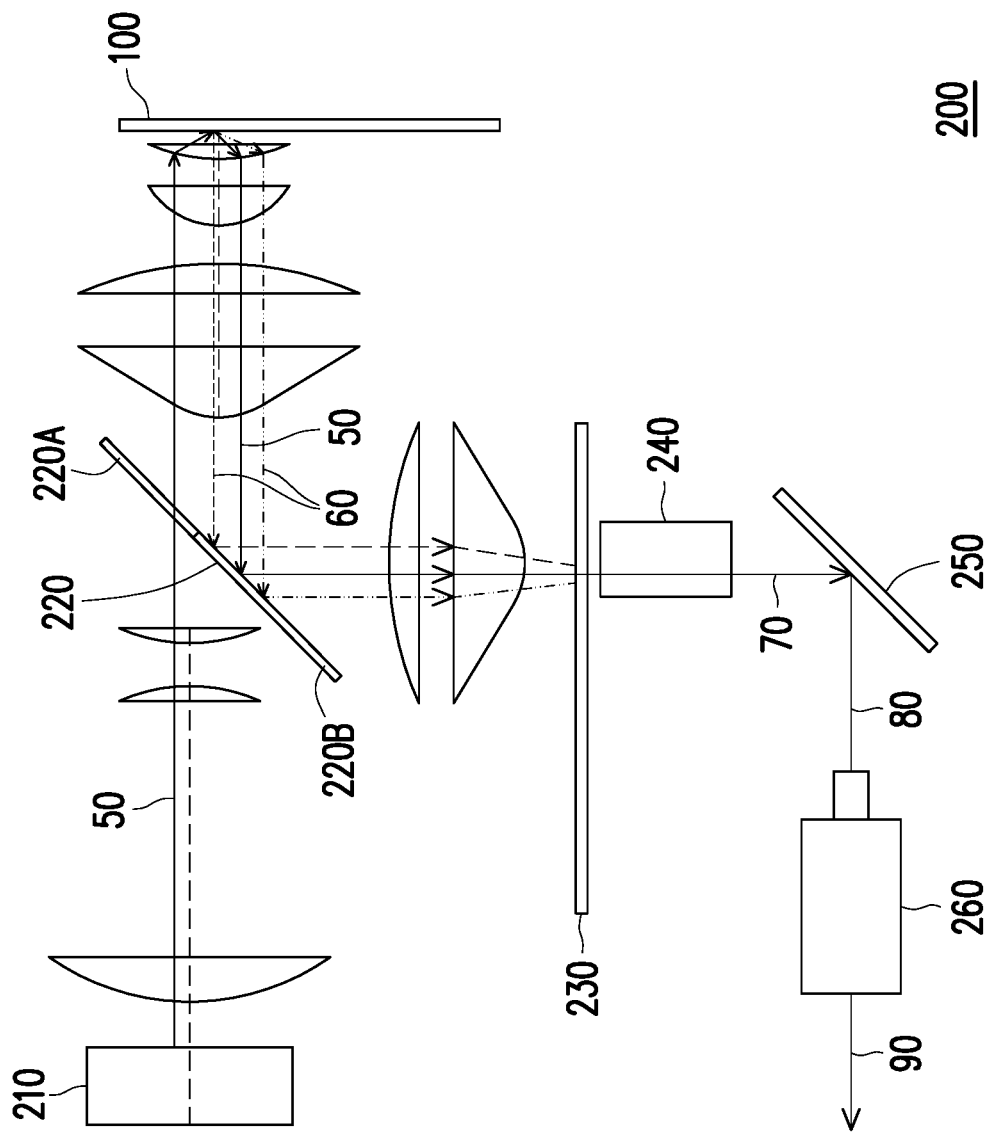
FIG. 2 is an architecture schematic of a projection device of an embodiment of the invention.

FIG. 2 is an architecture schematic of a projection device of an embodiment of the invention. Referring to FIG. 1A, FIG. 1B, and FIG. 2, a projection device 200 includes an excitation light source 210, a beam splitting unit 220, a wavelength conversion module 100, a light valve 250, and a projection lens 260. In the present embodiment, the structure of the wavelength conversion module 100 is described in detail in the foregoing, and is not repeated herein. In the present embodiment, the light valve 250 is, for instance, a digital micro-mirror device (DMD) or a liquid-crystal-on-silicon (LCOS) panel. However, in other embodiments, the light valve 250 may also be a transmissive liquid crystal panel or other beam modulators.

As shown in FIG. 2, in the present embodiment, the excitation light source 210 is adapted to emit an excitation light beam 50. In the present embodiment, the excitation light source 210 is a laser source, and the excitation light beam 50 is a blue laser beam. For instance, the excitation light source 210 may include a plurality of blue laser diodes (not shown) arranged in an array, but the invention is not limited thereto.

Specifically, as shown in FIG. 2, in the present embodiment, the splitting unit 220 is disposed in the transmission path of the excitation light beam 50 and located between the excitation light source 210 and the wavelength conversion module 100. Specifically, the splitting unit 220 may be a partially-transmissive partially-reflective element, a color separation element, a polarizing splitting element, or various other elements that may separate a beam. Specifically, in the present embodiment, a penetrating region 220A of the splitting unit 220 can, for instance, allow blue beam to pass through and provide a reflective effect for beams of other colors (such as red, green, or yellow). In other words, the penetrating region 220A of the splitting unit 220 may allow the blue excitation light beam 50 to pass through, and as a result, the excitation light beam 50 may pass through the splitting unit 220 and be incident to the wavelength conversion module 100.

For example, as shown in FIG. 1A, FIG. 1B and FIG. 2, the wavelength conversion module 100 is located in the transmission path of the excitation light beam 50, and at least one wavelength conversion region WR of the wavelength conversion module 100 is adapted to convert the excitation light beam 50 into at least one converted beam 60, and the light passing region TR of the wavelength conversion module 100 is adapted to reflect the excitation light beam 50 such that the excitation light beam 50 is transmitted to a subsequent optical element. In addition, the wavelength conversion module 100 further includes a first actuator (not shown) adapted to allow the light passing region TR and the at least one wavelength conversion region WR to enter the illumination range of the excitation light beam 50 at different times and selectively allow the excitation light beam 50 to pass through or be converted into the at least one converted beam 60. Thereafter, as shown in FIG. 2, the excitation light beam 50 from the wavelength conversion module 100 and the at least one converted beam 60 may be guided to the beam splitting unit 220 and be reflected by a reflection region 220B of the beam splitting unit 220 to a subsequent filter module 230.

For example, as shown in FIG. 2, the projection device 200 further includes a filter module 230. The filter module 230 is located in the transmission path of the excitation light beam 50 and the converted beam 60, and has a filter optical region (not shown) and a light transmission region (not shown). The filter module 230 further includes a second actuator (not shown) adapted to allow the filter optical region (not shown) to correspondingly enter the illumination range of the converted beam 60 at different times to respectively form a red light and a green light. Moreover, a translucent region (not shown) also correspondingly enters the illumination range of the excitation light beam 50 transmitted to the filter module 230 at a different time to form a blue light. As a result, the excitation light beam 50 and the converted beam 60 may be formed into an illumination beam 70 having a plurality of different colors in sequence.

Moreover, as shown in FIG. 2, in the present embodiment, the projection device 200 further includes a light-homogenizing element 240 located in the transmission path of the illumination beam 70. In the present embodiment, the light-homogenizing element 240 includes an integral column, but the invention is not limited thereto. More specifically, as shown in FIG. 2, when the illumination beam 70 is transmitted to the light-homogenizing element 240 via an illumination system, the light-homogenizing element 240 may homogenize the illumination beam 70 and transmit the illumination beam 70 to the light valve 250.

Next, as shown in FIG. 2, the light valve 250 is located in the transmission path of the illumination beam 70 and is adapted to form the illumination beam 70 into an image beam 80. The projection lens 260 is located in the transmission path of the image beam 80 and is adapted to form the image beam 80 into a projection beam 90 to project the projection beam 90 onto a screen (not shown) to form an image. Since after the illumination beam 70 is converged on the light valve 250, the light valve 250 forms the illumination beam 70 into an image beam 80 of different colors to be transmitted to the projection lens 260, the image projected by the image beam 80 converted by the light valve 250 may form a color image.

In this way, the wavelength conversion module 100 of the projection device 200 may fill the first holes CA using the filling adhesive FM via the filling adhesive channel FC formed by the first holes CA, thereby improving the conversion efficiency of the wavelength conversion layer 120. Moreover, the wavelength conversion module 100 may also enhance the transmittance of visible light by the configuration of the first matching material layer 130, thereby improving the conversion efficiency of the wavelength conversion layer 120. In addition, since the projection device 200 uses the wavelength conversion module 100 having good conversion efficiency, the projection device 200 may therefore have good conversion efficiency and optical quality.

In the above embodiments, although the projection device 200 is exemplified by the wavelength conversion module 100 including the light passing region TR for reflecting the excitation light beam 50, the invention is not limited thereto. In other embodiments, the light passing region TR of the wavelength conversion module 100 may also allow the excitation light beam 50 to pass through. Anyone skilled in the art may make appropriate changes to the optical path after referring to the invention, which is still within the scope of the invention. In the following, some embodiments are provided for description.

Figure 3:
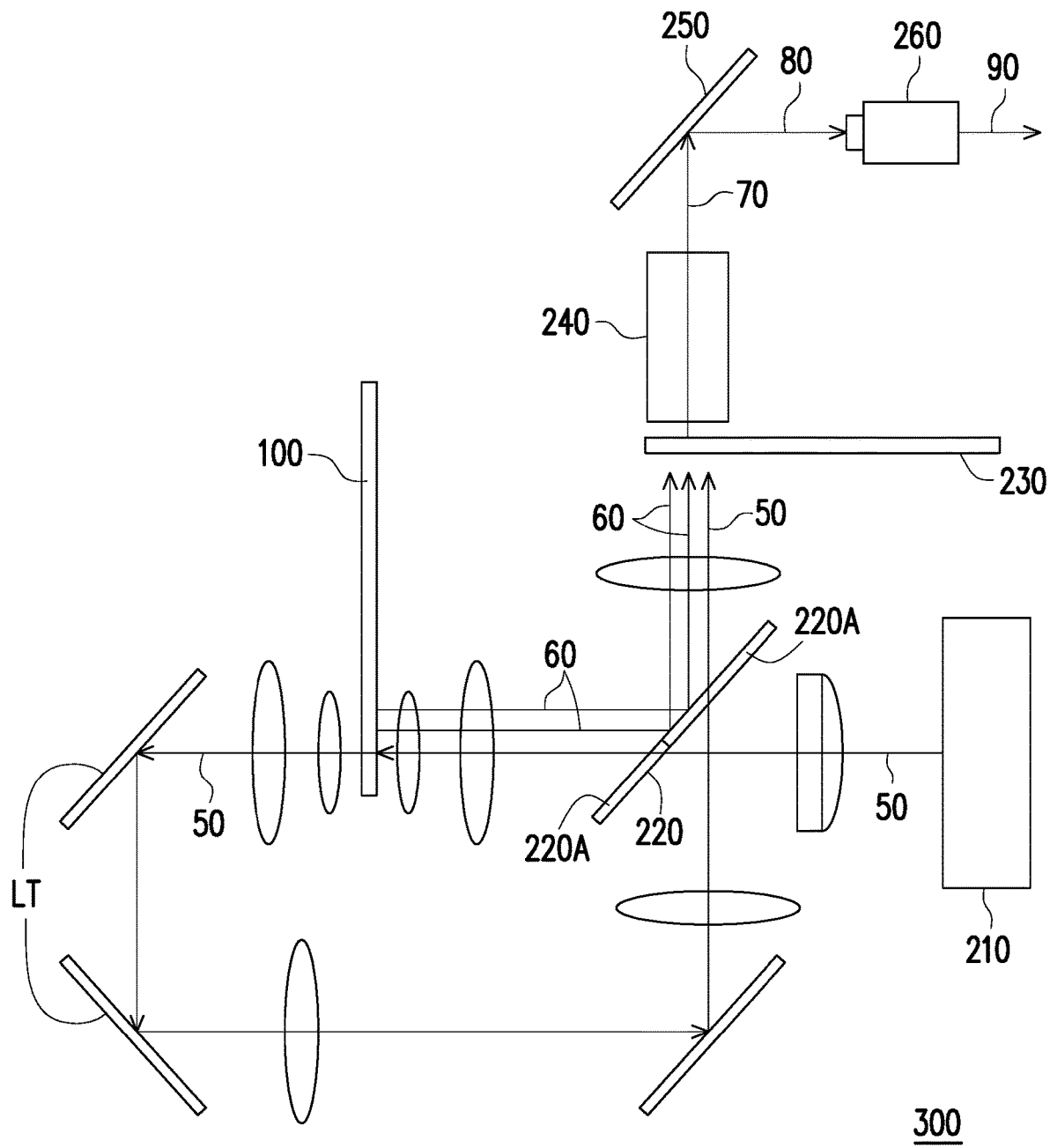
FIG. 3 is an architecture schematic of another projection device of an embodiment of the invention.

FIG. 3 is an architecture schematic of another projection device of an embodiment of the invention. Referring to FIG. 3, a projection device 300 of the present embodiment is similar to the projection device 200 of FIG. 2, and the differences of the two are described below. In the wavelength conversion module 100 of the projection apparatus 300 of the present embodiment, the substrate 110 located in the light passing region TR has a hollow structure. That is, in the embodiment of FIG. 3, the light passing region TR of the wavelength conversion module 100 is used to allow the excitation light beam 50 to pass through.

Specifically, as shown in FIG. 1B and FIG. 3, in the present embodiment, when the transmission region TR of the wavelength conversion module 100 enters the illumination region of the excitation light beam 50, the excitation light beam 50 passes through the wavelength conversion module 100, and then is transmitted onto a filter module 230 via an optical transmission module LT. Moreover, in the present embodiment, when the at least one wavelength conversion region TR enters the illumination range of the excitation light beam 50, the excitation light beam 50 is converted by the at least one wavelength conversion region TR into the at least one converted beam 60. Next, as shown in FIG. 1A, the at least one converted beam 60 from the wavelength conversion module 100 may be guided to the splitting unit 220 and be reflected onto the subsequent filter module 230. The filter module 230 then separately forms the excitation light beam 50 and the at least one converted beam 60 into red light, green light, and blue light, respectively, and thereby form the subsequent illumination beam 70 and image beam 80.

In this way, the wavelength conversion module 100 of the projection device 300 may fill the first holes CA using the filling adhesive FM via the filling adhesive channel FC formed by the first holes CA, thereby improving the conversion efficiency of the wavelength conversion layer 120. Moreover, the wavelength conversion module 100 may also enhance the transmittance of visible light by the configuration of the first matching material layer 130, thereby improving the conversion efficiency of the wavelength conversion layer 120. In addition, since the projection device 300 uses the wavelength conversion module 100 having good conversion efficiency, the projection device 300 may therefore have good conversion efficiency and optical quality.

Based on the above, the embodiments of the invention have at least one of the following advantages or efficacies. In an embodiment of the invention, the projection device and the wavelength conversion module may fill the first holes using the filling adhesive via the filling adhesive channel formed by the first holes, thereby improving the conversion efficiency of the wavelength conversion layer. Moreover, the wavelength conversion module may also enhance the transmittance of visible light by the configuration of the first matching material layer, thereby improving the conversion efficiency of the wavelength conversion layer. In addition, since the projection device uses the wavelength conversion module having good conversion efficiency, the projection device may therefore have good conversion efficiency and optical quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, comprising:
   a substrate;
   a first matching material layer, located on the substrate;
   a wavelength conversion layer, located between the substrate and the first matching material layer, comprising:
      a plurality of first holes;
      a wavelength conversion material; and
      a bonding material, wherein the wavelength conversion material is dispersed in the bonding material;
   a second matching material layer, located between the substrate and the wavelength conversion layer; and
   a filling adhesive channel, connected to the first matching material layer and the second matching material layer, and the second matching material layer, the filling adhesive channel, and the first matching material layer have a filling adhesive with the same material, wherein the filling adhesive comprises at least one of a silicone, an epoxy resin, an alcohol soluble inorganic binder, or an aqueous inorganic binder;
   wherein a component of the filling adhesive is different from a component of the bonding material.

2. The wavelength conversion module of claim 1, wherein a range of a volume percentage of the plurality of first holes in the wavelength conversion layer is equal to or greater than 5%.

3. The wavelength conversion module of claim 1, wherein the second matching material layer comprises the filling adhesive, and after the filling adhesive penetrates to a portion of the plurality of first holes of the wavelength conversion layer via a capillary action, the first matching material layer is formed on a surface of the wavelength conversion layer.

4. The wavelength conversion module of claim 1, wherein a thickness of the first matching material layer is greater than 0 and less than or equal to 30 microns.

5. The wavelength conversion module of claim 1, wherein a refractive index of the first matching material layer is smaller than a refractive index of the wavelength conversion layer.

6. The wavelength conversion module of claim 1, wherein a range of a refractive index of the first matching material layer is equal to or greater than 1.1 and less than or equal to 1.9.

7. The wavelength conversion module of claim 1, wherein a thickness of the second matching material layer is less than or equal to 0.1 mm.

8. The wavelength conversion module of claim 1, wherein the second matching material layer comprises a silicone containing a heat conductive material powder or an epoxy resin containing a heat conductive material powder.

9. The wavelength conversion module of claim 8, wherein a thickness of the second matching material layer is less than or equal to 0.2 mm.

10. The wavelength conversion module of claim 1, wherein a transmittance of a visible light having a wavelength ranging between 400 nm and 700 nm penetrating the first matching material layer or the second matching material layer is greater than 90%.

11. A projection device, comprising:
    a wavelength conversion module, comprising:
       a substrate;
       a first matching material layer, located on the substrate;
       a wavelength conversion layer, located between the substrate and the first matching material layer, and comprising:
          a plurality of first holes;
          a wavelength conversion material; and
          a bonding material, wherein the wavelength conversion material is dispersed in the bonding material;
       a second matching material layer, located between the substrate and the wavelength conversion layer; and
       a filling adhesive channel, connected to the first matching material layer and the second matching material layer, wherein the second matching material layer, the filling adhesive channel, and the first matching material layer have a filling adhesive with the same material, wherein the filling adhesive comprises at least one of a silicone, an epoxy resin, an alcohol soluble inorganic binder, or an aqueous inorganic binder;
       wherein a component of the filling adhesive is different from a component of the bonding material;
    an excitation light source, adapted to emit an excitation light beam, wherein the excitation light beam is transmitted to the wavelength conversion module and is formed into an illumination beam via the wavelength conversion module;
    a light valve, located in a transmission path of the illumination beam and is adapted to form the illumination beam into an image beam; and
    a projection lens, located in a transmission path of the image beam and is adapted to form the image beam into a projection beam.

12. The projection device of claim 11, wherein a range of a volume percentage of the plurality of first holes in the wavelength conversion layer is equal to or greater than 5%.

13. The projection device of claim 11, wherein the second matching material layer comprises the filling adhesive, and after the filling adhesive penetrates to a portion of the plurality of first holes of the wavelength conversion layer via a capillary action, the first matching material layer is formed on a surface of the wavelength conversion layer.

14. The projection device of claim 11, wherein a thickness of the first matching material layer is greater than 0 and less than or equal to 30 microns.

15. The projection device of claim 11, wherein a refractive index of the first matching material layer is smaller than a refractive index of the wavelength conversion layer.

16. The projection device of claim 11, wherein a range of a refractive index of the first matching material layer is equal to or greater than 1.1 and less than or equal to 1.9.

17. The projection device of claim 11, wherein the second matching material layer comprises a silicone containing a heat conductive material powder or an epoxy resin containing a heat conductive material powder.

18. The projection device of claim 11, wherein a transmittance of a visible light having a wavelength range falling between 400 nm and 700 nm penetrating the first matching material layer or the second matching material layer is greater than 90%.

\* \* \* \* \*